United States Patent
Imura

(10) Patent No.: US 6,556,619 B2
(45) Date of Patent: Apr. 29, 2003

(54) FREQUENCY ADJUSTING CIRCUIT IN CODE DIVISION MULTIPLE ACCESS COMMUNICATION SYSTEM

(75) Inventor: Minoru Imura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/944,416

(22) Filed: Sep. 4, 2001

(65) Prior Publication Data

US 2002/0027471 A1 Mar. 7, 2002

(30) Foreign Application Priority Data

Sep. 5, 2000 (JP) ........................................ 2000-268783

(51) Int. Cl.$^7$ ................................................ H04B 1/69
(52) U.S. Cl. ........................ 375/147; 375/340; 375/326
(58) Field of Search ................................ 375/147, 150, 375/340, 322, 326, 324, 339, 344, 362; 370/206, 335, 342, 441, 479; 455/161.1, 164.1, 165.1, 182.1, 183.1, 258, 260, 264, 265

(56) References Cited

U.S. PATENT DOCUMENTS

| | | | | |
|---|---|---|---|---|
| 5,533,068 A | * | 7/1996 | Muto | .......................... 375/344 |
| 5,535,249 A | * | 7/1996 | Miyashita | .................... 329/302 |
| 5,822,364 A | * | 10/1998 | Yamada et al. | ............. 375/147 |
| 5,982,821 A | * | 11/1999 | Kingston et al. | ........... 329/315 |
| 6,104,748 A | * | 8/2000 | Kaku | .......................... 375/235 |
| 6,160,838 A | * | 12/2000 | Shinohara et al. | .......... 375/130 |
| 6,226,505 B1 | * | 5/2001 | Uda | ............................. 375/344 |
| 6,353,358 B1 | * | 3/2002 | Yoshie | ........................ 329/304 |
| 6,363,102 B1 | * | 3/2002 | Ling et al. | ................... 375/147 |

* cited by examiner

Primary Examiner—Chi Pham
Assistant Examiner—Khanh Cong Tran
(74) Attorney, Agent, or Firm—Foley & Lardner

(57) ABSTRACT

In a frequency adjusting circuit, an oscillator outputs cosine and sine waves. A quadrature demodulator extracts and outputs the baseband signal of an in-phase component from a carrier wave input from an antenna using the cosine wave and the baseband signal of a quadrature component from the carrier wave using the sine wave. First and second A/D converters convert the baseband signals into digital signals. First and second despreaders despread the digital signals. A frequency error detection section detects the error between the frequency of the carrier wave and the frequency of the cosine and sine waves from the values of the signals output from the despreaders. A reference oscillator outputs the value of an oscillation frequency as the frequency of the cosine and sine waves and changes the value of the oscillation frequency to cancel the detected frequency error.

10 Claims, 1 Drawing Sheet

FREQUENCY ADJUSTING CIRCUIT IN CODE DIVISION MULTIPLE ACCESS COMMUNICATION SYSTEM

BACKGROUND OF THE INVENTION

The present invention relates to a frequency adjusting circuit in a code division multiple access (to be referred to as a CDMA hereinafter) communication system, which performs adjustment to make the frequency of cosine and sine waves to be used for demodulation match the carrier frequency of a received CDMA modulated wave.

CDMA communication systems are currently being standardized by the 3GPP (Third Generation Partnership Project) as a standardization project that examines the international standard of third generation mobile communication systems. The specifications of a physical channel of a CDMA communication system and the like are defined by the 3GPP.

In a CDMA communication system, generally, a transmission signal transmitted from the transmitting side is given by $$\text{Transmission signal} = (Di+jDq) \times (Ci+jCq) \quad (1)$$

$Di$: transmission data of in-phase component
$Dq$: transmission data of quadrature component
$Ci$: in-phase component spreading code
$Cq$: quadrature component spreading code
$j$: imaginary number
(+ represents exclusive OR (to be referred to as EXOR hereinafter))

An in-phase component spreading code $Ci$ and quadrature component spreading code $Cq$ are formed by multiplying a spreading code $SP$ by a scramble code $SCi$ of an in-phase component and a scramble code $SCq$ of a quadrature component, respectively, and are given by $$Ci = SP + SCi \quad (2)$$
$$Cq = SP + SCq \quad (3)$$

(+ represents EXOR)

The transmission signal is received by the receiving section of a base station or terminal and demodulated by multiplying it by the complex conjugate of the spreading code, as indicated by $$\text{Transmission signal} \times (Ci-jCq) = (Di+jDq) \times (Ci+jCq) \times (Ci-jCq) = A(Di+jDq) \quad (4)$$

(A is a coefficient, and + represents EXOR)

In a CDMA communication system, normally, dedicated channels for initial synchronization are defined for spreading code identification. These channels are called synchronization channels (to be referred to as SCHs hereinafter). The SCHs include the first synchronization channel (P-SCH) and second synchronization channel (S-SCH). In the CDMA communication system, it is first necessary to acquire the SCH on the receiving side. In the 3GPP, a symbol $Cpsc$ of the first synchronization channel is defined by $$a = <x1, x2, x3, \ldots, x6> = <1, 1, 1, 1, 1, 1, -1, 1, -1, 1, -1, -1, 1> \quad (5)$$

$$Cpsc = (1+j) \times <a, a, a, a, a, a, a, a, a, a, a, a, a, a, a, a> \quad (6)$$

In a CDMA communication system, the receiving side must adjust the frequency of cosine and sine waves to be used for demodulation such that the value of the frequency of the cosine and sine waves to be used for demodulation matches the value of the frequency of the carrier wave. Hence, a CDMA communication system generally has a frequency adjusting circuit for adjusting the frequency to be used for demodulation.

In a conventional frequency adjusting circuit, synchronization is established using a synchronization channel (to be referred to as an SCH hereinafter) and then the frequency to be used for demodulation is adjusted using a common pilot channel (to be referred to as a CPICH hereinafter). In the conventional frequency adjusting circuit, in receiving the CPICH, the value of the frequency of cosine and sine waves to be used for demodulation is switched to some appropriate frequency values to obtain reception results at corresponding times, and the value of the frequency of the most likely one of the reception results is determined as the value of the frequency of the cosine and sine waves to be used for demodulation.

The initial frequency error generated between the frequency of a carrier wave and that to be used for demodulation is closely related to the time until the first common control physical channel (to be referred to as a P-CCPCH hereinafter). For this reason, the frequency adjusting circuit preferably adjusts the frequency error to be used for demodulation. However, since the conventional frequency adjusting circuit selects the optimum frequency to be used for demodulation by trial and error, frequency adjustment is time-consuming.

In addition, the conventional frequency adjusting circuit detects the initial frequency error at the stage of CPICH. At the stage of SCH, the initial frequency error has not been eliminated yet. For this reason, even a place at which a radio wave from a base station arrives may be determined as an incommunicable zone at the stage of SCH due to the initial frequency error.

As described above, the conventional frequency adjusting circuit has the following two problems.

(1) Since the optimum frequency to be used for demodulation is selected by trial and error, frequency adjustment is time-consuming, and the time until P-CCPCH detection becomes long.

(2) Since the initial frequency error is detected at the stage of CPICH, the initial frequency error has not been eliminated yet at the stage of SCH. For this reason, even a place at which a radio wave from a base station arrives may be determined as an incommunicable zone due to the initial frequency error.

SUMMARY OF THE INVENTION

It is the first object of the present invention to provide a frequency adjusting circuit capable of quickly correcting an initial frequency error and shortening the time until P-CCPCH detection.

It is the second object of the present invention to provide a frequency adjusting circuit capable of correcting the error between the frequency of a carrier wave and the frequency of a sine wave for demodulation at the stage of SCH and preventing any incommunicable zone determination for a mobile station due to an initial frequency error in the range where radio waves can reach.

In order to achieve the above objects, according to the present invention, there is provided a frequency adjusting circuit comprising an oscillator for outputting cosine and sine waves, quadrature demodulation means for extracting and outputting a baseband signal of an in-phase component from a carrier wave input from an antenna using the cosine wave output from the oscillator and extracting and outputting a baseband signal of a quadrature component from the carrier wave using the sine wave output from the oscillator, a first A/D converter for converting the baseband signal of the in-phase component output from the quadrature demodulation means into a digital signal and outputting the digital signal, a second A/D converter for converting the baseband signal of the quadrature component output from the quadrature demodulation means into a digital signal and outputting the digital signal, a first despreader for despreading and outputting the signal output from the first A/D converter, a second despreader for despreading and outputting the signal output from the second A/D converter, frequency error detection means for detecting an error between a frequency of the carrier wave and a frequency of the cosine and sine waves output from the oscillator in accordance with a value of the signal output from the first despreader and a value of the signal output from the second despreader, and a reference oscillator for outputting a value of an oscillation frequency as the frequency of the cosine and sine waves to be output from the oscillator and changing a value of the oscillation frequency so as to cancel the frequency error detected by the frequency error detection means.

DESCRIPTION OF THE PREFERRED EMBODIMENT

Figure 1:
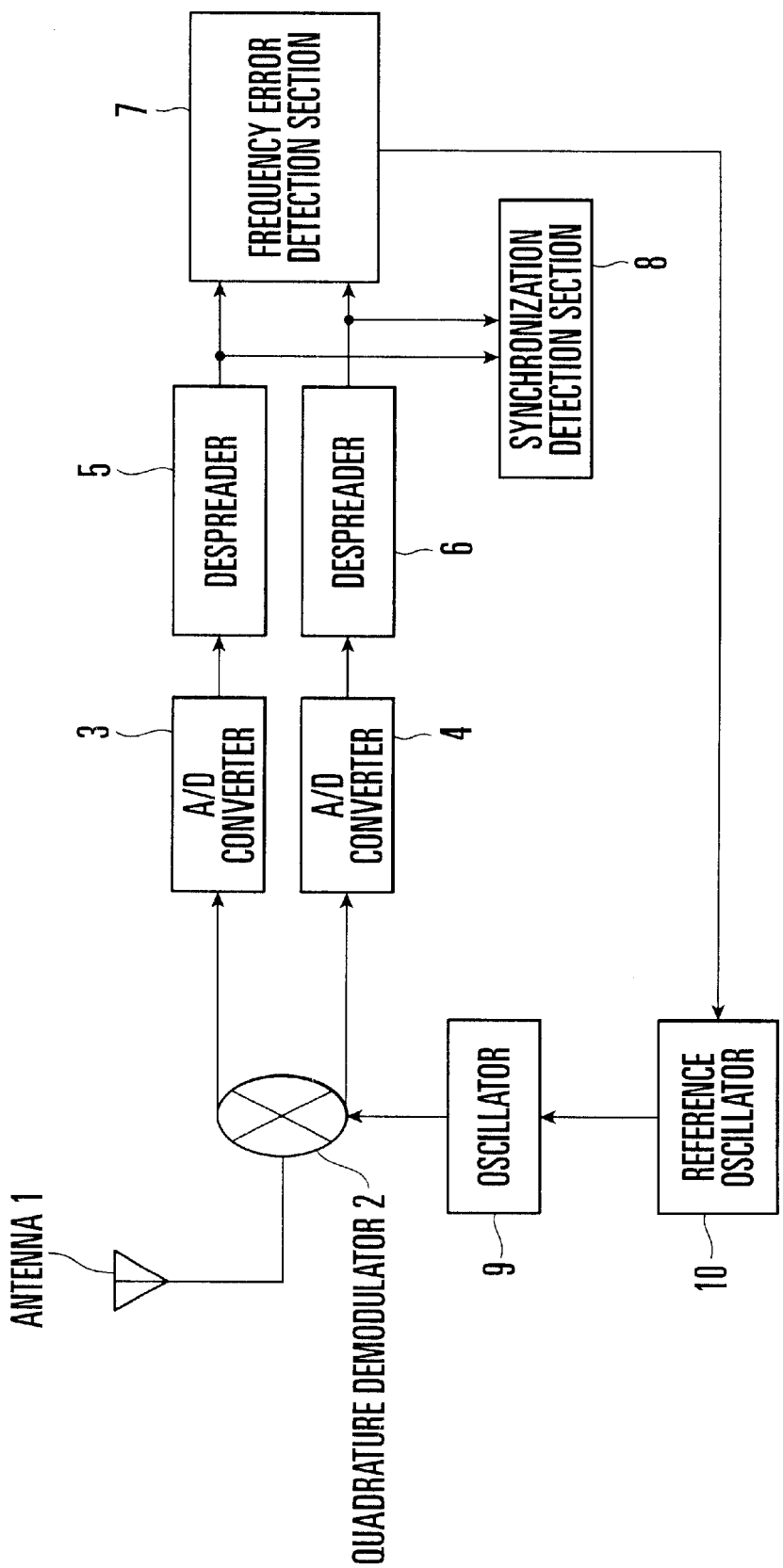
FIG. 1 is a block diagram showing the arrangement of a frequency adjusting circuit of the present invention.

A frequency adjusting circuit of the present invention will be described in detail with reference to the accompanying drawing.

FIG. 1 shows the arrangement of the frequency adjusting circuit of the present invention.

The frequency adjusting circuit of the present invention comprises an antenna 1, quadrature demodulator 2, A/D converters 3 and 4, despreaders 5 and 6, frequency error detection section 7, synchronization detection section 8, oscillator 9, and reference oscillator 10.

The antenna 1 receives a CDMA modulated carrier wave transmitted from a transmitting side. The quadrature demodulator 2 extracts and outputs the baseband signal of the in-phase component from the carrier wave input from the antenna using a cosine wave output from the oscillator 9, and also extracts and outputs the baseband signal of the quadrature component from the carrier wave using a sine wave output from the oscillator 9. Letting $\cos(wt+\theta)$ be the carrier wave and $\Delta w$ be the angular frequency error, the baseband signal of the in-phase component and the baseband signal of the quadrature component are given by $$\cos\{(w+\Delta w)t+\theta\} \times \cos wt = \frac{1}{2}\{\cos(\Delta wt+\theta)+\cos(2w+\Delta wt+\theta)\} \quad (7)$$

$$\sin\{(w+\Delta w)t+\theta\} \times \sin wt = \frac{1}{2}\{\sin(\Delta wt+\theta)+\sin(2w+\Delta wt+\theta)\} \quad (8)$$

where w is the angular frequency of the carrier wave, and $\theta$ is the modulation phase. When the modulation scheme is BPSK (Bi-Phase Shift Keying), $\theta=0, \pi$.

The second term of each of equations (7) and (8) is removed by an LPF (Low Pass Filter) (not shown) provided in the quadrature demodulator 2. Hence, the quadrature demodulator 2 outputs ½ cos ($\Delta wt+\theta$) as the baseband signal of the in-phase component and ½ sin ($\Delta wt+\theta$) as the baseband signal of the quadrature component.

The A/D converters 3 and 4 convert the baseband signal of the in-phase component and the baseband signal of the quadrature component, which are extracted by the quadrature demodulator 2, into digital signals, respectively. The baseband signal of the in-phase component and the baseband signal of the baseband signal, which are converted into digital signals, are input to the despreaders 5 and 6 and despread by the above-described spreading code.

The synchronization detection section 8 acquires a synchronization signal from each despread signal and detects/holds its synchronization timing. When synchronization is detected/held, e.g., the output from a data decoder (not shown) connected to each of the despreaders 5 and 6 is received as decoded data.

The frequency error detection section 7 receives the despread component signals and obtains the square values of the respective signals, which are given by $$\cos^2(\Delta wt+\theta)=\frac{1}{2}\cos(2\Delta wt+2\theta)+\frac{1}{2} \quad (9)$$

$$\sin^2(\Delta wt+\theta)=-\frac{1}{2}\cos(2\Delta wt+2\theta)+\frac{1}{2} \quad (10)$$

Since a symbol Cpsc of a synchronization channel SCH is modulated by the BPSK scheme, the phase $\theta$ is 0 or $\pi$. Hence, cos $(2\Delta wt+2\theta)=\cos(2\Delta wt)$.

The frequency error detection section 7 obtains the values given by equations (9) and (10) several times, detects the angular frequency error $\Delta w$ from those values, and outputs the angular frequency error $\Delta w$.

The number of times of obtaining the values given by equations (9) and (10) can be arbitrarily set in accordance with the channel reception state. The number of times may be automatically changed in correspondence with, e.g., the C/N (Carrier/Noise) ratio.

The reference oscillator 10 changes the value of the oscillation frequency of the oscillator 9, i.e., the frequency of the cosine and sine waves to be output and outputs the frequency such that the value of the angular frequency error $\Delta w$ to be output from the frequency error detection section 7 becomes small.

In the frequency adjusting circuit of the present invention, the initial frequency error is detected by the SCH when the modulation scheme of the channel to be calculated is the BPSK scheme. When the modulation scheme of the channel to be calculated is the QPSK (Quad-Phase Shift Keying) scheme, the frequency error detection section 7 can detect the frequency error by obtaining not the square but the fourth power of the value of each baseband signal.

As has been described above, since the frequency adjusting circuit of the present invention has the frequency error detection section 7 capable of detecting the value of the initial frequency error between the frequency of the carrier wave and that of the cosine and sine waves to be used for demodulation, the initial frequency error can be quickly corrected. Hence, the frequency adjusting circuit of the present invention can shorten the time until P-CCPCH.

In addition, since the frequency adjusting circuit of the present invention detects the initial frequency error at the stage of SCH, the initial frequency error can be corrected at the stage of SCH. Hence, in a CDMA communication system having the frequency adjusting circuit of this embodiment, any incommunicable zone determination for a mobile station due to an initial frequency error in the range of a radio wave can be prevented.

What is claimed is:

1. A frequency adjusting circuit comprising:

an oscillator for outputting cosine and sine waves;

quadrature demodulation means for extracting and outputting a baseband signal of an in-phase component from a BPSK modulated wave of a synchronization channel input from an antenna using the cosine wave output from said oscillator and extracting and outputting a baseband signal of a quadrature component from the carrier wave using the sine wave output from said oscillator;

a first A/D converter for converting the baseband signal of the in-phase component output from said quadrature demodulation means into a digital signal and outputting the digital signal;

a second A/D converter for converting the baseband signal of the quadrature component output from said quadrature demodulation means into a digital signal and outputting the digital signal;

a first despreader for despreading and outputting the signal output from said first A/D converter;

a second despreader for despreading and outputting the signal output from said second A/D converter;

frequency error detection means for obtaining a first square value of a value of the signal output from said first despreader and for obtaining a second square value of a value of the signal output from said second despreader several times, and for detecting, from the first square value, an error between a carrier frequency of the modulated wave and a frequency of the cosine wave output from said oscillator, and for detecting, from the second square value, an error between the carrier frequency of the modulated wave and a frequency of the sine wave output from said oscillator; and a reference oscillator for outputting a value of an oscillation frequency as the frequency of the cosine and sine waves to be output from said oscillator and changing a value of the oscillation frequency so as to cancel the frequency error detected by said frequency error detection means.

2. A circuit according to claim 1, wherein the frequency error is detected at the synchronization channel.

3. A frequency adjusting circuit comprising:

an oscillator for outputting cosine and sine waves;

quadrature demodulation means for extracting and outputting a baseband signal of an in-phase component from a QPSK modulated wave of a synchronization channel input from an antenna using the cosine wave output from said oscillator and extracting and outputting a baseband signal of a quadrature component from the carrier wave using the sine wave output from said oscillator;

a first A/D converter for converting the baseband signal of the in-phase component output from said quadrature demodulation means into a digital signal and outputting the digital signal;

a second A/D converter for converting the baseband signal of the quadrature component output from said quadrature demodulation means into a digital signal and outputting the digital signal;

a first despreader for despreading and outputting the signal output from said first A/D converter;

a second despreader for despreading and outputting the signal output from said second A/D converter;

frequency error detection means for obtaining a first fourth power value of a value of the signal output from said first despreader and for obtaining a second fourth power value of a value of the signal output from said second despreader several times, and for detecting, from the first fourth power value, an error between a carrier frequency of the modulated wave and a frequency of the cosine wave output from said oscillator, and for detecting, from the second fourth power value, an error between the carrier frequency of the modulated wave and a frequency of the sine wave output from said oscillator; and a reference oscillator for outputting a value of an oscillation frequency as the frequency of the cosine and sine waves to be output from said oscillator and changing a value of the oscillation frequency so as to cancel the frequency error detected by said frequency error detection means.

4. A circuit according to claim 3, wherein the frequency error is detected at the synchronization channel.

5. A code division multiple access receiver comprising:

an antenna for receiving a code division multiple access modulated wave;

an oscillator for outputting cosine and sine waves;

quadrature demodulation means for extracting and outputting a baseband signal of an in-phase component from a BPSK modulated wave of a synchronization channel of the received code division multiple access modulated wave using the cosine wave output from said oscillator and extracting and outputting a baseband signal of a quadrature component from the carrier wave using the sine wave output from said oscillator;

a first A/D converter for converting the baseband signal of the in-phase component output from said quadrature demodulation means into a digital signal and outputting the digital signal;

a second A/D converter for converting the baseband signal of the quadrature component output from said quadrature demodulation means into a digital signal and outputting the digital signal;

a first despreader for despreading and outputting the signal output from said first A/D converter;

a second despreader for despreading and outputting the signal output from said second A/D converter;

frequency error detection means for obtaining a first square value of a value of the signal output from said first despreader and for obtaining a second square value of a value of the signal output from said second despreader several times, and for detecting, from the first square value, an error between a carrier frequency of the BPSK modulated wave and a frequency of the cosine wave output from said oscillator, and for detecting, from the second square value, an error between the carrier frequency of the BPSK modulated wave and a frequency of the sine wave output from said oscillator; and a reference oscillator for outputting a value of an oscillation frequency as the frequency of the cosine and sine waves to be output from said oscillator and changing a value of the oscillation frequency so as to cancel the frequency error detected by said frequency error detection means.

6. A code division multiple access receiver comprising:

an antenna for receiving a code division multiple access modulated wave;

an oscillator for outputting cosine and sine waves;

quadrature demodulation means for extracting and outputting a baseband signal of an in-phase component from a QPSK modulated wave of a synchronization channel of the received code division multiple access modulated wave using the cosine wave output from said oscillator and extracting and outputting a baseband signal of a quadrature component from the carrier wave using the sine wave output from said oscillator;

a first A/D converter for converting the baseband signal of the in-phase component output from said quadrature demodulation means into a digital signal and outputting the digital signal;

a second A/D converter for converting the baseband signal of the quadrature component output from said quadrature demodulation means into a digital signal and outputting the digital signal;

a first despreader for despreading and outputting the signal output from said first A/D converter;

a second despreader for despreading and outputting the signal output from said second A/D converter;

frequency error detection means for obtaining a first fourth power value of a value of the signal output from said first despreader and for obtaining a second fourth power value of a value of the signal output from said second despreader several times, and for detecting, from the first fourth power value, an error between a carrier frequency of the QPSK modulated wave and a frequency of the cosine wave output from said oscillator, and for detecting, from the second fourth power value, an error between the carrier frequency of the QPSK modulated wave and a frequency of the sine wave output from said oscillator; and a reference oscillator for outputting a value of an oscillation frequency as the frequency of the cosine and sine waves to be output from said oscillator and changing a value of the oscillation frequency so as to cancel the frequency error detected by said frequency error detection means.

7. A code division multiple access receiver comprising:

an antenna for receiving a code division multiple access modulated wave;

oscillation means for outputting an oscillation frequency of cosine and sine waves;

quadrature demodulation means for extracting and outputting a baseband signal of an in-phase component from a BPSK modulated wave of a synchronization channel of the received code division multiple access modulated wave using the cosine wave and extracting and outputting a baseband signal of a quadrature component from the carrier wave using the sine wave;

a first AID converter for converting the baseband signal of the in-phase component output from said quadrature demodulation means into a digital signal and outputting the digital signal;

a second A/D converter for converting the baseband signal of the quadrature component output from said quadrature demodulation means into a digital signal and outputting the digital signal;

a first despreader for despreading and outputting the signal output from said first A/D converter;

a second despreader for despreading and outputting the signal output from said second A/D converter;

frequency error detection means for obtaining a first square value of a value of the signal output from said first despreader and for obtaining a second square value of a value of the signal output from said second despreader several times, and for detecting, from the first square value, an error between a carrier frequency of the BPSK modulated wave and a frequency of the cosine wave, and for detecting, from the second square value, an error between the carrier frequency of the BPSK modulated wave and a frequency of the sine wave; and a reference oscillator for the oscillation frequency so as to cancel the frequency error detected by said frequency error detection means.

8. A code division multiple access receiver comprising:

an antenna for receiving a code division multiple access modulated wave;

an oscillator for outputting an oscillation frequency of cosine and sine waves;

quadrature demodulation means for extracting and outputting a baseband signal of an in-phase component from a QPSK modulated wave of a synchronization channel of the received code division multiple access modulated wave using the cosine wave and extracting and outputting a baseband signal of a quadrature component from the carrier wave using the sine wave;

a first A/D converter for converting the baseband signal of the in-phase component output from said quadrature demodulation means into a digital signal and outputting the digital signal;

a second A/D converter for converting the baseband signal of the quadrature component output from said quadrature demodulation means into a digital signal and outputting the digital signal;

a first despreader for despreading and outputting the signal output from said first A/D converter;

a second despreader for despreading and outputting the signal output from said second A/D converter;

frequency error detection means for obtaining a first fourth power value of a value of the signal output from said first despreader and for obtaining a second fourth power value of a value of the signal output from said second despreader several times, and for detecting, from the first fourth power value, an error between a carrier frequency of the QPSK modulated wave and a frequency of the cosine wave, and for detecting, from the second fourth power value, an error between the carrier frequency of the QPSK modulated wave and a frequency of the sine wave; and means for changing the oscillation frequency so as to cancel the frequency error detected by said frequency error detection means.

9. A circuit according to claim 1, wherein the frequency error between the carrier frequency of the modulated wave and the frequency of the cosine wave is determined by dividing a frequency component of the first square wave value by two.

10. A circuit according to claim 3, wherein the frequency error between the carrier frequency of the modulated wave and the frequency of the cosine wave is determined by dividing a frequency component of the first fourth power value by four.

* * * * *